STABLE SOLUTIONS OF ORGANO-MERCURY SALTS

Arthur Schwerdle, Vineland, N. J., assignor to Vineland Chemical Company, Vineland, N. J., a firm No Drawing. Application April 15, 1952,
Serial No. 282,486

3 Claims. (Cl. 167—30)

The object of the invention in its broadest sense is to provide stable solutions of organo-mercury salts of higher degrees of concentration than has heretofore been possible, and in the method of making same.

It is well known that phenyl mercury salts are potent germicides and fungicides, but that they are relatively insoluble in water, in fact to such a degree that probably the most common form, namely, phenyl mercury acetate, is soluble only to the extent of approximately between 1 to 1000 and 1 to 500, while phenyl mercuric chloride is soluble in water only to the extent of approximately 1 to 20,000.

By the addition of sodium or potassium hydroxide to a suspension of the relatively insoluble acetate in water, a solubility of up to approximately 5% can be attained by the formation of phenyl mercuric hydroxide. An excess of ammonia appears to have a similar effect, as the resulting total solubility is about the same. However, if aqueous ammonia is added to water suspensions of phenyl mercuric acetate in close to equimolecular proportions there is presumed to have been formed the corresponding diammino salts in a manner analogous to the formation of similar inorganic salts of mercury, copper, cobalt, etc., wherein a considerable increase in the phenyl mercuric ion concentration results in the case of the phenyl mercuric salts.

Probably the most common example of such a reaction is that of the intense blue color of the copper tetrammono salt formed upon adding an excess of ammonia to a soluble copper salt. The phenyl mercuric diammono complex solubility characteristics differ in that an excess of ammonia causes a decreased solubility of phenyl mercury, whereas in the case of copper lesser equivalents cause the formation of the insoluble cupric hydroxide. The exact nature of this ammono complex as it pertains to phenyl mercury has not been definitely established, but it is known to be a relatively loose association, so that phenyl mercury ammono salts in aqueous solution produce the characteristic reactions of the phenyl mercuric ion, such as precipitation by chlorides, thiocyanates, silicates, sulphides, etc.

This property of phenyl mercuric salts—taking, for example, the acetate as the most common—of dissolving in an amount of ammonia sufficient to form the ammono complex has proved to be exceedingly helpful in the preparation of phenyl mercuric derivatives from the acetate as the parent compound, due to the fact that it has been a method whereby the phenyl mercuric acetate can be solubilized in water to from 5%–20%, or even more, depending upon the temperature, and from which substantially non-ionic derivatives can be precipitated and isolated, as for example the thiosulphate, iodide, thiocarbamates and mercaptides.

This method was early employed by Pesci in order to prepare such compositions. However, rather than employ precise equivalents of ammonia, Pesci used a mixture of ammonium hydroxide and ammonium acetate to solubilize phenyl mercury salts. This ammonia-ammonium acetate mixture, which in effect appears to act as a buffer, is an easier way of making relatively stable concentrated solutions, and although the mechanism involved is not fully and clearly understood, it is believed that the ammonium acetate represses the ammonia into the most soluble of the system-triad, that is, the phenyl mercuri ammono complex rather than the phenyl mercuric hydroxide, or the acetate thereof, the inherent drawback of instability and hence lower degree of solubility of the complex dissociation products being thereby overcome.

Thus, it is known that the addition of 0.2 mol of ammonium chloride to a liter of a N/10 solution of ammonium hydroxide acts to repress the ionization of the hydroxyl radical more than one hundred fold. This same phenomenon is believed to operate in the phenyl mercury complex system, which may be set forth in the sense of a chemical equilibrium, wherein one or another of the system's components A, B, C, F is favored by the concentration of the components D and E:

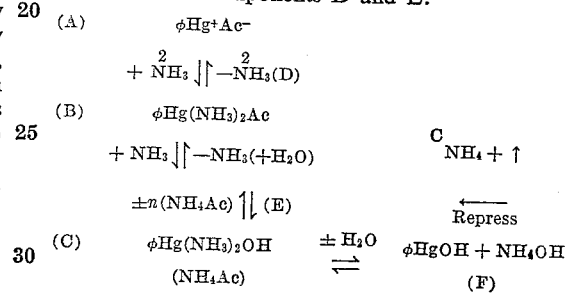

While this particular system is illustrated, it is merely intended to indicate what can be expected and accomplished by the use of an amine-acid system, of which the above is the simplest form. Obviously, certain limitations are impressed upon the system, as not all acids and amines function in this manner for a number of reasons. For example, polyhydroxy compounds, whether of amine or acid nature, are undesirable because of the fact that they are easily oxidized and promote dismutation of phenyl mercury salts to diphenyl mercury and mercurous acetate, probably through the intermediate formation of a phenyl mercurous ion as in an acid, or a phenyl mercuric free radical. Many of the aldehydes and ketones should likewise be excluded, while substantially water-insoluble amines and acids are similarly not suitable. Compounds containing active hydrogen tend to decompose.

In recent years, as the germicidal and fungicidal properties of phenyl mercuric acetate have become more fully known, these aqueous solutions have provided a fairly convenient means of transporting and using phenyl mercuric salts in agricultural and industrial applications. However, since these solutions have inherent limitations, in that relatively dilute concentrations must be prepared in order to prevent a crystallization of the active components, from 8% to 12% concentrations are generally the highest that may be prepared for all practical purposes. Furthermore, they have the additional disadvantage in that they are quite corrosive with respect to iron and steel, and consequently must be shipped in special containers. In addition, during the winter months the water frequently freezes, which tends to burst the containers, and/or also cause settling out of the active components, thereby resulting in subsequent difficulties in re-dissolving and using the preparation.

Furthermore, the transportation charges prove to be an uneconomical factor, when about 90% of the solution is water, instead of the greater portion comprising the toxicant factor. It is, therefore, obviously preferable to pipe a concentrated solution of non-corrosive nature to points that involve difficulty of access, as for example in paper mill systems. In many cases it is necessary to apply phenyl mercury salts to fabrics in order to mildewproof them. Often the same fabrics are water or fireproofed, either simultaneously or with reduction to as few application baths as possible. Some of these baths must be applied in an acid, or slightly acid, condition, such for instance as aqueous wax dispersions at a pH of about 5. It is a very definite advantage to have concentrated neutral solutions of phenyl mercury, because they are compatible with, acid, neutral, or alkaline dispersions of the aforementioned materials, as alkaline solutions might and often do produce precipitations or agglomerations, thus inactivating or preventing the proper function of the aforementioned conjoint treatment.

After extensive investigation and research, it was discovered that by suitable admixture of ammonia, amide and organic solvents, a much higher concentration of phenyl mercuric salts can be obtained than was previously believed possible. In fact, solutions in excess of 50% have been prepared and shelf-aged for extended periods without the slightest deterioration, such as is frequently encountered in alkaline reducing organic solvents. Such highly concentrated solutions have the added advantage in that they may be dispersed in or on an active carrier, whether subsequently soluble or insoluble for use in weed control, agricultural spray, inclusion in resin or rubber stock, and otherwise. Solutions of the present invention are stable at temperatures between approximately −20° F. and 120° F. Examples of phenyl mercury salts to which the present invention is applicable are the thiocyanate, butyrate, glycollate, propionate, acetate and formate. The present invention is particularly applicable to the use of the acetate and propionate salts.

They have the added advantage in that lesser soluble compounds, such as the thiocyanate, sulphur derivatives, hydroxyquinoline, or phenol derivatives, as for example alkylated and chlorinated phenols, may be dissolved in very substantial amounts, so that these normally insoluble materials can be transported as a solution, which preferably in the presence of a wetting or dispersing agent can be added to an aqueous system, to form a colloidal dispersion suitable for inclusion in paper beater stock and entrainment therein, where an aqueous solution would have no such adherence. Such suspensions are also suitable for use in cloth treatment, in surface sprays where a prolonged effect is desired, in water-soluble paints, in carpets, in agricultural herbicides and in fungicides, where a more prolonged and innocuous mercurial compound is desired.

It has also been found possible to prepare phenyl mercuric propionate in the same manner as the acetate with certain distinct advantages. By increasing the oleophyllic nature of the radical of the mercuriating agent, such as a change to mercuric propionate rather than using the mercuric acetate, makes phenyl mercuriation possible without the use of a benzene-mercuric acetate miscibilizer, such as acetic acid which in normal acetoxy mercuriation is needed in from 35% to 50% of the benzene volume simply to effect a homogeneous system. It is necessary to use a 10 to 1 molar ratio of benzene to mercuric ion in order to avoid polymercuriation.

By using the propionate, the increased benzene solubility allows one to dispense with the great excess of miscibilizer and use a straight benzene solution of the mercuric propionate. In this manner, the effective working capacity of the vessel can be virtually doubled. The propionoxy mercuriation of benzene does not proceed as rapidly as does the acetoxy mercuriation. By the inclusion of a suitable catalyst, such for example as nitric acid in amounts of less than 1% and as low as 0.1%, the mercuriation rate may be adjusted to be complete in from a few hours to 12 hours. Very rapid mercuriation is not desirable because it tends to form polymercurials, which are not as fungicidal or herbicidal as the monomercuriated benzene.

This is a highly advantageous process, in that it allows a lower processing temperature, and because the need of a miscibilizer, which usually has to be removed, is eliminated. A miscibilizer in such a case is usually distilled off from the processed reaction mixture by employing steam at 50 lbs. pressure, which results in a milder treatment of the reaction product and hence a purer product. The product phenyl mercury propionate is less soluble in water and in ammonia or ammonia-ammonium propionate salt solutions than the acetate, thus further aggravating the disadvantages previously set forth. To overcome the limited solubility effects previously mentioned, use is made of the method or process which is an object of the present invention, as hereinafter set forth and which makes the above method or process more economical by reason of the heightened solubility that it effects.

Although ammonia has been specifically discussed above as an essential component of the present composition, it may be replaced in whole or in part by an amine, such as those amines in which the alkyl groups contain no more than four carbon atoms. However, the use of ammonia is particularly preferred. Likewise, the formamide may be replaced in whole or in part by other amides such as those containing no more than four carbon atoms. However, the use of formamide in accordance with the present invention is particularly preferred.

Formamide is a fairly good solvent for phenyl mercuric acetate, dissolving up to 10% at normal room temperatures. However, it has been found that this concentration can be approximately tripled by the conjoint use of ammonium hydroxide and formamide, gaining probably maximum solubility by the use of an approximately 2:1 molar equivalent of ammonia to the phenylmercuric acetate, presumably forming the phenyl mercury diammono acetate, as a higher ratio of ammonia holds no advantage but by contrast causes a lesser degree of solubility. Further research indicated that this mixture alone has inadequate low temperature solubilization for the complex, but it was found that inclusion of certain miscible solvents greatly aided the low temperature stability. Thus for example, morpholine, dioxane, diisopropyl ether and isopropanol are suitable additives for this purpose. However, the preferred solvents are the water-soluble alcohols—methyl alcohol, ethyl alcohol, propyl alcohol and isopropyl alcohol. They may be used in varying proportions, but generally about 25% of the weight of the formamide is best. Ammonia may be added as a gas to the amide-phenyl mercuric acetate solution suspension rather than as an aqueous solution. Some advantage is obtained in that less water is required, thereby effecting a greater degree of solubility.

It is also possible to manufacture phenyl mercuric solutions directly in this manner without isolating the phenyl mercury salt by water precipitation, washing and drying, which tends towards degenerative changes, since organic mercuric compounds are quite sensitive to any manipulations. Thus, a mercuric salt may be reacted with excess benzene to form the corresponding phenyl mercury salt. After the excess benzene is distilled off, the product may be added to a mixture comprising formamide and a water-soluble alcohol, and the mixture adjusted to approximate neutrality with ammonia. As a specific example, 1000 lbs. mercuric oxide, 500 lbs. acetic anhydride and 100 gallons of 68–32 ratio thiophene free benzene and refined glacial acetic acid are stirred together for 2 hours at 45°–55° C., which after addition of the catalyst is reacted for approximately 4 hours, or in any case until mercuriation is complete, after which the benzene and acetic acid are removed by distillation. The reaction mixture, heated finally for a short period of time under 50 lbs. steam pressure, is discharged into a mixture of 100 gallons of formamide and 50 gallons of isopropanol. This is cooled and agitated in a jacketed kettle, and concentrated ammonia is added until a test portion of the mixture readily and completely dissolves in water. The resultant water solution is neutral to phenolphthalein, and the solution will titrate between 35% and 40% phenyl mercury expressed as the thiocyanate. A similar procedure may be followed where mercuric propionate or other mercury salt is the mercuriating agent.

Having thus described my invention, what I claim and desire to protect by Letters Patent of the United States is:

1. A composition of matter consisting essentially of a phenyl mercury salt, ammonia and formamide, the concentration of phenyl mercury salt in said composition being greater than its solubility in either ammonia or formamide alone.

2. The composition of claim 1 wherein the molecular ratio of ammonia to phenyl mercury salt is approximately 2 to 1.

3. The composition of claim 1 wherein the phenyl mercury salt comprises phenyl mercuric acetate.

References Cited in the file of this patent

UNITED STATES PATENTS

| | | |
|---|---|---|
| 2,027,905 | Gath | Jan. 14, 1936 |
| 2,418,986 | Rampel | Apr. 15, 1947 |
| 2,422,951 | Conant | June 24, 1947 |
| 2,423,262 | Sowa | July 1, 1947 |
| 2,497,509 | Miescher | Feb. 14, 1950 |
| 2,619,446 | Andersen | Nov. 25, 1952 |

FOREIGN PATENTS

| | | |
|---|---|---|
| 743,310 | Germany | Dec. 22, 1943 |
| 524,166 | Germany | May 2, 1931 |
| 610,281 | France | Sept. 2, 1926 |

OTHER REFERENCES

Parks: Jour. Am. Chem. Soc., vol. 33, pp. 3331–3336 (1941).

Science: Vol. 78, No. 2030, p. 6, Nov. 24, 1933.

Metalorganics, Inc.: Pamphlet "Phenyl Mercurics," 1947, p. 12.